United States Patent
Yazawa et al.

(10) Patent No.: US 11,509,502 B2
(45) Date of Patent: Nov. 22, 2022

(54) EDGE DEVICE, CONTROL METHOD, AND PROGRAM

(71) Applicant: NIPPON TELEGRAPH AND TELEPHONE CORPORATION, Tokyo (JP)

(72) Inventors: Gou Yazawa, Musashino (JP); Hideaki Kimura, Musashino (JP); Erina Takeshita, Musashino (JP); Akihiro Morita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 124 days.

(21) Appl. No.: 16/970,782

(22) PCT Filed: Feb. 18, 2019

(86) PCT No.: PCT/JP2019/005919
§ 371 (c)(1),
(2) Date: Aug. 18, 2020

(87) PCT Pub. No.: WO2019/163724
PCT Pub. Date: Aug. 29, 2019

(65) Prior Publication Data
US 2021/0099323 A1 Apr. 1, 2021

(30) Foreign Application Priority Data
Feb. 21, 2018 (JP) .............................. JP2018-029130

(51) Int. Cl.
*H04L 12/28* (2006.01)
*H04L 12/46* (2006.01)
(Continued)

(52) U.S. Cl.
CPC ...... *H04L 12/4641* (2013.01); *H04L 12/4604* (2013.01); *H04L 41/12* (2013.01); *H04L 47/822* (2013.01); *H04L 2012/4629* (2013.01)

(58) Field of Classification Search
CPC . H04L 12/4641; H04L 12/4604; H04L 41/12; H04L 47/822; H04L 2021/4629;
(Continued)

(56) References Cited

U.S. PATENT DOCUMENTS 8,001,269 B1 * 8/2011 Satapati .................. H04L 69/40
709/245
8,650,286 B1 * 2/2014 Sajassi .................. H04L 45/586
709/224

(Continued)

OTHER PUBLICATIONS

Practical Cisco Routers, published 1999, QUE Publishing, pp. 124, 129, 134, 198, 200, 321.*

(Continued)

*Primary Examiner* — Stephen M D Agosta

(57) ABSTRACT

An object of the present invention is to provide an edge device, a control method, and a program with which the effects of loop generation can be minimized from the NW operator side while ensuring connection normality with the device of an NW user. An edge device according to the present invention physically closes an access port upon confirmation that the access port has been connected to an external device while the access port is in a physically released state and a DF state is undefined, notifies other edge devices within an EVPN MH configuration that the host device has entered a state in which the host device may become the DF and causes an EVPN function unit to calculate the DF state to be set, physically opens the access port when the calculation result indicates DF, and physically closes the access port when the calculation result indicates BDF.

5 Claims, 20 Drawing Sheets

(51) Int. Cl.
*H04L 41/12* (2022.01)
*H04L 47/70* (2022.01)

(58) Field of Classification Search
CPC ..... H04W 24/02; H04W 40/02; H04W 48/20; H04W 84/18; H04W 60/005; H04W 88/06; G06F 11/00; G06F 11/08; G06F 11/20; G06F 11/202; G06F 11/3006; G06F 11/3041
See application file for complete search history.

(56) References Cited

U.S. PATENT DOCUMENTS

| | | | | |
|---|---|---|---|---|
| 8,705,526 | B1* | 4/2014 | Hasan | H04L 1/22 370/389 |
| 8,780,699 | B1* | 7/2014 | Hasan | H04L 1/22 370/219 |
| 8,792,501 | B1* | 7/2014 | Rustagi | H04L 45/245 370/395.53 |
| 8,797,844 | B1* | 8/2014 | Strahle | H04L 45/28 370/219 |
| 9,019,814 | B1* | 4/2015 | Mohanty | H04L 45/00 370/219 |
| 9,391,885 | B1* | 7/2016 | Shukla | H04L 45/66 |
| 9,628,409 | B1* | 4/2017 | Yuvaraj | H04L 49/201 |
| 11,394,641 | B1* | 7/2022 | Massaguer | H04L 45/04 |
| 2002/0078232 | A1* | 6/2002 | Simpson | H04L 45/22 709/239 |
| 2005/0265308 | A1* | 12/2005 | Barbir | H04L 12/4641 370/351 |
| 2005/0281194 | A1* | 12/2005 | Sonoda | H04L 1/22 370/219 |
| 2010/0296517 | A1* | 11/2010 | Kompella | H04L 45/46 370/408 |
| 2013/0201986 | A1* | 8/2013 | Sajassi | H04L 12/4679 370/390 |
| 2014/0143591 | A1* | 5/2014 | Chiang | G06F 11/2002 714/4.11 |
| 2016/0021015 | A1* | 1/2016 | Thoria | H04L 47/2483 370/235 |
| 2016/0112350 | A1* | 4/2016 | Morrison | H04L 45/22 370/218 |
| 2016/0344628 | A1* | 11/2016 | Hocker | H04L 12/4633 |
| 2017/0063600 | A1* | 3/2017 | Singh | H04L 12/18 |
| 2017/0141963 | A1* | 5/2017 | Chalapathy | H04L 12/4641 |

OTHER PUBLICATIONS

A.Sajassi, Ed, et al. "BGP MPLS-Based Ethernet VPN." RFC 7432, Feb. 2015. < https://tools.ietf.org/pdf/rfc7432.pdf >.

* cited by examiner

| ACCESS PORT NUMBER | ACCESS PORT SETTING INFORMATION |
|---|---|
| 1 | OPEN |
| 2 | CLOSED |
| ... | ... |
| N | OPEN |

| ACCESS PORT NUMBER | ACCESS PORT STATE |
|---|---|
| 1 | LINKED-UP |
| 2 | LINKED-DOWN |
| ... | ... |
| N | LINKED-DOWN |

| EVPN-ORIENTED ACCESS PORT STATE | EVPN INFORMATION | CALCULATION NECESSITY | INFORMATION GENERATION COMMAND |
|---|---|---|---|
| NO CHANGE | UP↔DOWN CHANGE DETECTED IN OTHER DEVICE | NECESSARY | NOT NECESSARY |
| | DISCONNECTION OF SESSION WITH OTHER DEVICE DETECTED | | |
| | CALCULATION COMMAND FROM OTHER DEVICE DETECTED | | |
| | NORMAL (*) | NOT NECESSARY | |
| UP↔DOWN CHANGE | UP↔DOWN CHANGE DETECTED IN OTHER DEVICE | NECESSARY | NECESSARY |
| | DISCONNECTION OF SESSION WITH OTHER DEVICE DETECTED | | |
| | CALCULATION COMMAND FROM OTHER DEVICE DETECTED | | |
| | NORMAL (*) | | |

* UP↔DOWN CHANGE IN OTHER DEVICE, DISCONNECTION OF SESSION WITH OTHER DEVICE, AND CALCULATION COMMAND FROM OTHER DEVICE NOT DETECTED

| ID | EDGE DEVICE IP ADDRESS | GF/SDF STATE | STATE OF EDGE DEVICE |
|---|---|---|---|
| A | 192.168.10.xa | SDF | Up |
| A | 192.168.10.xb | GF | Up |
| A | 192.168.10.xc | SDF | Up |
| B | 192.168.20.ya | SDF | Up |
| B | 192.168.20.yb | GF | Up |
| C | 192.168.30.za | GF/SDF UNDEFINED | Down |

Fig. 18

| DF/BDF STATE | ACCESS PORT STATE | EVPN-ORIENTED ACCESS PORT STATE |
|---|---|---|
| DF | LINKED-UP | LINKED-UP |
| DF | LINKED-DOWN | LINKED-DOWN |
| BDF | LINKED-UP | -(*1) |
| BDF | LINKED-DOWN | LINKED-DOWN |
| DF/BDF UNDEFINED | LINKED-UP | LINKED-UP (*2) |
| DF/BDF UNDEFINED | LINKED-DOWN | LINKED-DOWN |

*1 ACCORDING TO THE SYSTEM, THIS STATE CANNOT EXIST, AND THEREFORE, WHEN THIS STATE OCCURS, A DEVICE FAULT IS SUSPECTED.

*2 AFTER THIS STATE OCCURS, EVEN IF THE STATE OF THE ACCESS PORT CHANGES TO LINKED-DOWN, AS LONG AS DF/BDF REMAINS UNDEFINED, THE LINK-UP IS MAINTAINED.

| ACCESS PORT SETTING STATE | OF/BDF STATE | ACCESS PORT STATE | OPEN/CLOSE ACCESS PORT |
|---|---|---|---|
| OPEN | OF | LINKED-UP | OPEN |
| | | LINKED-DOWN | |
| | BDF | LINKED-UP | CLOSE |
| | | LINKED-DOWN | |
| | OF/BDF UNDEFINED | LINKED-UP | KEEP CLOSED(*1) |
| | | LINKED-DOWN | OPEN |
| CLOSED | OF | LINKED-UP | (*2) |
| | | LINKED-DOWN | |
| | BDF | LINKED-UP | |
| | | LINKED-DOWN | |
| | OF/BDF UNDEFINED | LINKED-UP | CLOSE |
| | | LINKED-DOWN | |

*1 AFTER THIS STATE OCCURS, EVEN IF THE STATE OF THE ACCESS PORT CHANGES TO LINKED-DOWN AND EVEN IF THE SETTING STATE OF THE ACCESS PORT CHANGES TO CLOSED, AS LONG AS OF/BDF REMAINS UNDEFINED, THE ACCESS PORT IS KEPT CLOSED.

*2 ACCORDING TO THE SYSTEM, THIS STATE CANNOT EXIST, AND THEREFORE, WHEN THIS STATE OCCURS, A DEVICE FAULT IS SUSPECTED.

| OPEN/CLOSE ACCESS PORT | ACCESS PORT STATE | COMPLETION DETERMINATION |
|---|---|---|
| OPEN | LINKED-UP → LINKED-DOWN | COMPLETE |
| | LINKED-DOWN → LINKED-UP | - |
| | NO CHANGE | - |
| CLOSE | LINKED-UP → LINKED-DOWN | COMPLETE |
| | LINKED-DOWN → LINKED-UP | - |
| | NO CHANGE | - |

EDGE DEVICE, CONTROL METHOD, AND PROGRAM

CROSS-REFERENCE TO RELATED APPLICATIONS

This application is a 371 U.S. National Phase of International Application No. PCT/JP2019/005919, filed on Feb. 18, 2019, which claims priority to Japanese Application No. 2018-029130, filed on Feb. 21, 2018. The entire disclosures of the above applications are incorporated herein by reference.

TECHNICAL FIELD

The present disclosure relates to an edge device of an EVPN (Ethernet (registered trademark) Virtual Private Network), a control method for controlling the edge device, and a program for realizing the control method.

BACKGROUND ART

In recent years, Ethernet (registered trademark) VPN (EVPN) technology has been gaining attention as Layer-2/Layer-3 VPN technology (for example, see NPL 1). When an EVPN is used, BUM (broadcast, unicast, multicast) traffic can be suppressed in comparison with a conventional L2 VPN.

CITATION LIST

Non Patent Literature

NPL 1: RFC 7432 https://tools.ietf.org/pdf/rfc7432.pdf (retrieved 9 Feb. 2018)

SUMMARY OF INVENTION

Technical Problem

When an edge device of an EVPN network is made redundant (EVPN MH (EVPN Multihoming)), if no anti-loop measures are taken and a simple configuration such as that shown in FIG. 1 is formed, a loop is generated, making normal communication difficult. To avoid this, it is necessary to implement anti-loop measures such as setting a LAG (Link Aggregation Group) in a switch (SW) under the control of the edge device, as in the configuration shown in FIG. 2.

In the network (NW) configuration of FIG. 2, a responsibility demarcation point may be provided between the NW provider and the NW user so as to realize a configuration such as that shown in FIG. 3. In this case, a NW user with malicious intent may purposely refrain from setting loop prevention measures such as a LAG so as to generate a loop and thereby attack the EVPN network by squeezing the bandwidth thereof. A loop may also be generated due to a fault in the device of the NW user.

Hence, on an EVPN network, whether or not the NW user sets a LAG or the like may go beyond the responsibility demarcation point and affect the area of responsibility of the NW provider. Moreover, it is difficult to prevent this from occurring within the area of responsibility of the NW provider.

Therefore, to solve the problem described above, an object of the present invention is to provide an edge device, a control method, and a program with which the effects of loop generation can be minimized from the NW operator side while ensuring connection normality with a device of an NW user.

Means for Solving the Problem

To achieve the object described above, the present invention closes one of the ports on the side of a responsibility demarcation point of redundant edge devices on an EVPN network.

More specifically, an edge device according to the present invention is an edge device within an EVPN MH (Ethernet (registered trademark) Virtual Private Network Multihoming) configuration, including: an access port for connecting to an external device; an EVPN function unit for calculating either DF (Designated Forwarder) or BDF (Backup DF) as a DF state of a host device and setting the DF state of the host device on the basis of the calculation result; and a control unit that physically closes the access port upon confirmation that the access port has been connected to an external device while the access port is in a physically released state and the DF state is undefined, notifies other edge devices within the EVPN MH configuration that the host device has entered a state in which the host device may become the DF and causes the EVPN function unit to calculate the DF state to be set, physically opens the access port when the calculation result indicates DF, and physically closes the access port when the calculation result indicates BDF.

Further, a control method according to the present invention is a method for controlling an edge device within an EVPN MH configuration, the edge device having an access port for connecting to an external device and an EVPN function unit for calculating either DF or BDF as a DF state of a host device and setting the DF state of the host device on the basis of the calculation result, the control method including: physically closing the access port upon confirmation that the access port has been connected to an external device while the access port is in a physically released state and the DF state is undefined; notifying other edge devices within the EVPN MH configuration that the host device has entered a state in which the host device may become the DF and causing the EVPN function unit to calculate the DF state to be set; physically opening the access port when the calculation result indicates DF; and physically closing the access port when the calculation result indicates BDF.

According to the present invention, when the edge device is started, the link-up state thereof is checked instantaneously to ensure connection normality with an NW user device, and immediately thereafter, the access port of the edge device is closed. With the present invention, therefore, the effects of loop generation can be minimized. Hence, the present invention can provide an edge device and a control method with which the effects of loop generation can be minimized from the NW operator side while ensuring connection normality with the device of an NW user.

When the connection between the access port and the external device is broken while the DF state of the host device is DF, the control unit of the edge device according to the present invention keeps the access port physically open, sets the DF state as Undefined, and causes another edge device included in an ES (Ethernet (registered trademark) Segment) of the host device to calculate the DF state to be set.

Further, the control method according to the present invention includes keeping the access port physically open, setting the DF state as Undefined, and causing another edge device included in an ES of the host device to calculate the DF state to be set when the connection between the access port and the external device is broken while the DF state of the host device is DF.

According to the present invention, even when a fault is detected between the edge device and the NW user device, communication can be continued using another edge device in the same ES as the DF. Moreover, by keeping the access port open even in this state, connection normality can be ensured when the edge device is reconnected to the NW user device.

When the calculation result indicates DF, the control unit of the edge device according to the present invention physically opens the access port after confirming that the access ports of all of the other edge devices included in the ES of the host device are physically closed.

Further, the control method according to the present invention includes physically opening the access port after confirming that the access ports of all of the other edge devices included in the ES of the host device are physically closed when the calculation result indicates DF.

If opening and closing timings are not aligned when English Translation of a plurality of edge devices are started within the same ES, a loop may be generated. By confirming the states of the access ports of the other edge devices when opening the access port of the host device, loop generation can be prevented.

A program according to the present invention is a program for causing a computer to execute the control method described above. The control method according to the present invention can be realized by a computer and a program, and the program can either be recorded on a recording medium or provided over a network.

Effects of the Invention

The present invention can provide an edge device, a control method, and a program with which the effects of loop generation can be minimized from the NW operator side while securing connection normality with a device of an NW user.

BRIEF DESCRIPTION OF DRAWINGS

FIG. 14 is a table illustrating access port setting information.
FIG. 15 is a table illustrating access port states.
FIG. 16 is a table illustrating determination references used during a DF calculation.
FIG. 17 is a table illustrating states of the edge device.
FIG. 18 is a table illustrating access port states transmitted to other edge devices.
FIG. 19 is a table illustrating determination references for opening and closing the access port.
FIG. 20 is a table illustrating references for determining that access port closure is complete.

DESCRIPTION OF EMBODIMENTS

Figure 1:
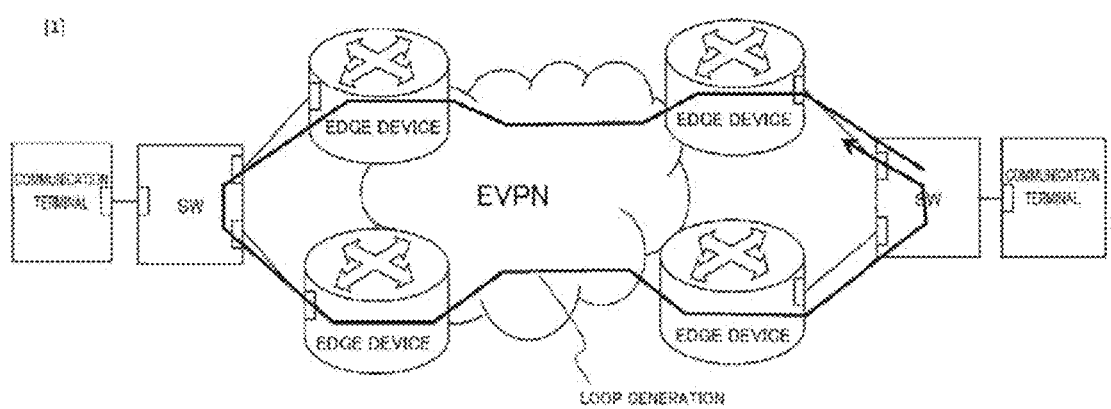
FIG. 1 is a view illustrating a cause of loop generation.
Figure 2:
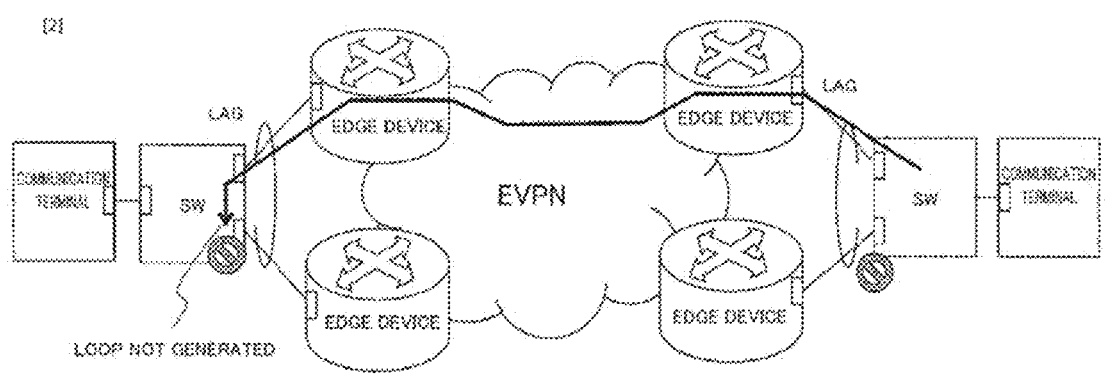
FIG. 2 is a view illustrating an example of an anti-loop measure.
Figure 3:
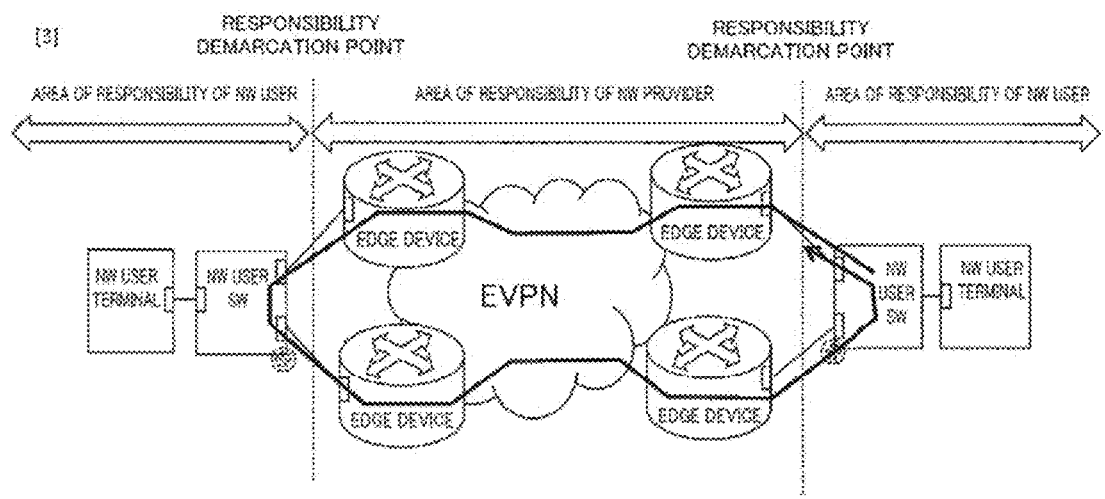
FIG. 3 is a view illustrating a responsibility demarcation point on a network.

Embodiments of the present invention will be described below with reference to the attached drawings. The embodiments described below are examples of the present invention, and the present invention is not limited to the following embodiments. Note that in the specification and drawings, constituent elements having identical reference numerals denote identical components. Further, in this specification, "/" means "or".

First Embodiment

Figure 4:
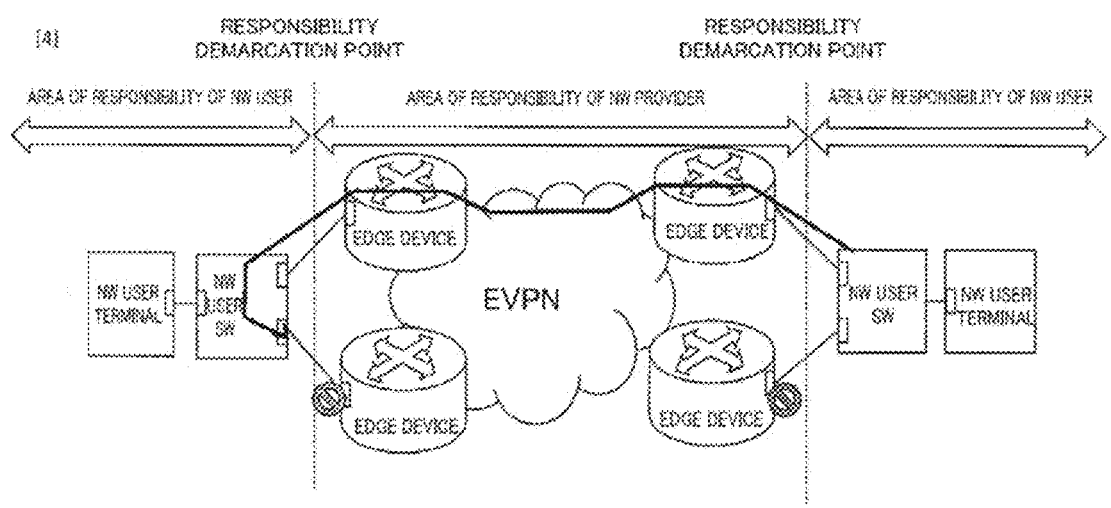
FIG. 4 is a view illustrating a network that includes an edge device according to the present invention.
Figure 5:
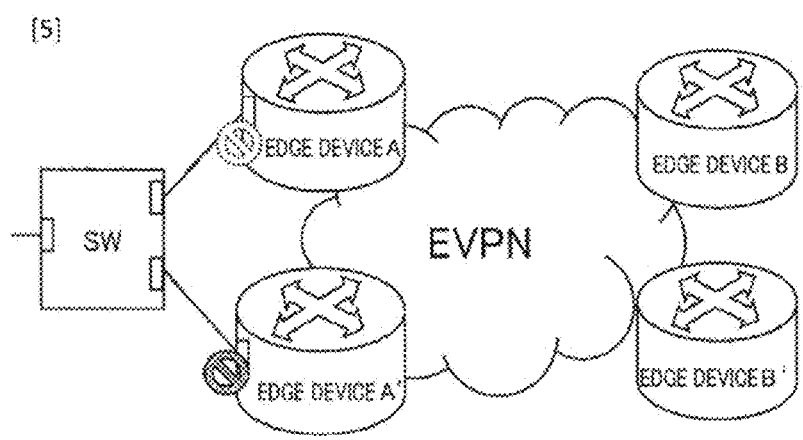
FIG. 5 is a view illustrating a network that includes the edge device according to the present invention.
Figure 6:
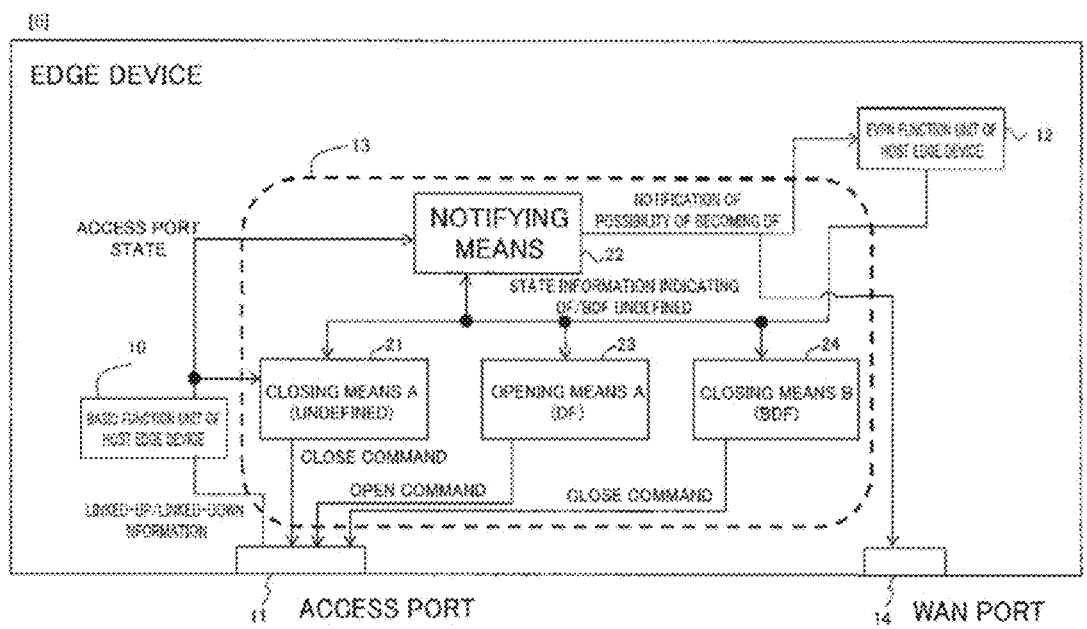
FIG. 6 is a block diagram illustrating a configuration of the edge device according to the present invention.
Figure 7:
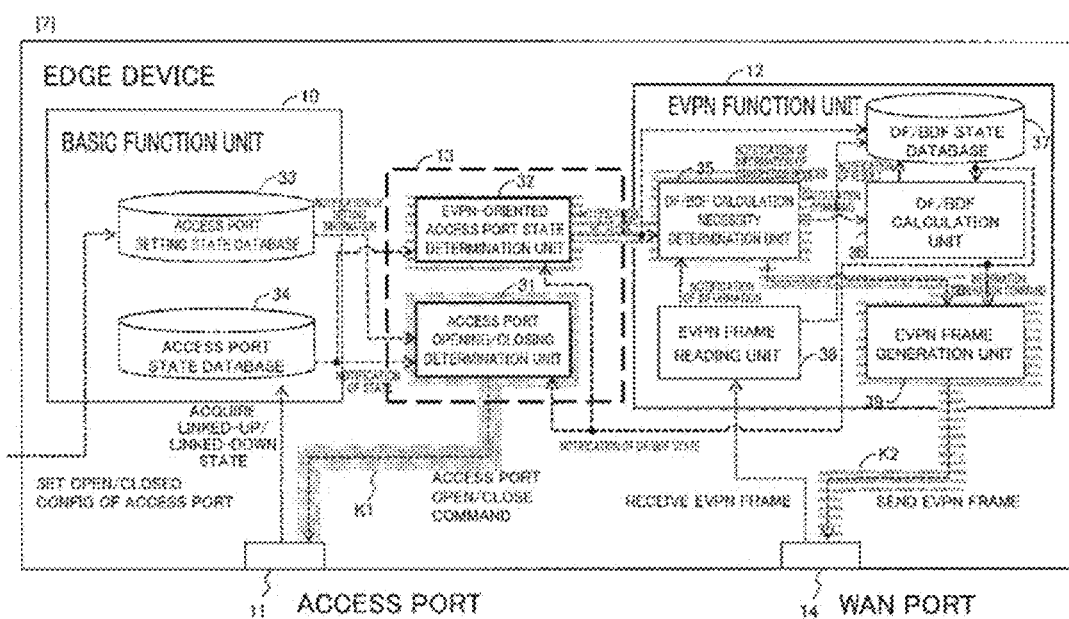
FIG. 7 is a block diagram illustrating a configuration of the edge device according to the present invention.

FIG. 4 is a view illustrating a communication system including an edge device of this embodiment. In this communication system, an anti-loop measure is taken within the area of responsibility of an NW provider managing an EVPN network by closing one of the ports on the side of the responsibility demarcation point of redundant edge devices on the EVPN network. This anti-loop measure will now be described using FIGS. 5 to 7. FIG. 5 is a view illustrating an embodiment of a communication system. FIGS. 6 and 7 are a schematic block diagram and a detailed block diagram illustrating functions of the edge device.

The edge device according to this embodiment is an edge device within an EVPN MH configuration, and includes an access port 11 for connecting to an external device, an EVPN function unit 12 for calculating either DF or BDF as a DF state of a host device and setting the DF state of the host device on the basis of the calculation result, and a control unit 13 that performs the following processing.

The control unit 13 physically closes the access port 11 after confirming that the access port 11 has been connected to an external device while the access port 11 is in a physically released state and the DF state is undefined (closing means A 21), notifies the other edge devices within the EVPN MH configuration that the host device has entered a state in which the host device may become the DF and causes the EVPN function unit 12 to calculate the DF state to be set (notifying means 22), physically opens the access port 11 when the calculation result indicates DF (releasing means A 23), and physically closes the access port 11 when the calculation result indicates BDF (closing means B 24).

The control unit 13 includes the closing means A 21, the notifying means 22, the opening means A 23, and the closing means B 24.

The closing means A 21 is "means for closing the access port as soon as the access port is linked up in a state where the DF/BDF state (described as non-DF in NPL 1) of the edge device in the EVPN MH is undefined".

The notifying means 22 is "means for notifying the host device and the other edge devices that the host device has entered a state in which the host device may become the DF even though the port is closed when the access port is linked up in a state where the DF/BDF state of the edge device in the EVPN MH is undefined".

The opening means A 23 is "means for opening the access port when the calculation result of the DF/BDF state of the edge device in the EVPN MH indicates DF".

The closing means B 24 is "means for closing the access port when the calculation result of the DF/BDF state of the edge device in the EVPN MH indicates BDF".

The function block diagram of FIG. 7 is divided into function units of an edge device conforming to normal EVPN MH and new function units (thick lines) provided by the present invention. Further, as the normally provided function units, the EVPN function unit 12 is shown as a unique function unit of EVPN MH, and a basic function unit 10 is shown as a function unit included in a typical edge device regardless of the EVPN MH protocol. Furthermore, in the function block diagram of FIG. 7, the closing means A 21, the opening means A 23, and the closing means B 24 are illustrated together as a function K1 including an access port opening/closing determination unit 31, while the notifying means 22 is illustrated as a function K2 including an EVPN-oriented access port state determination unit 32, a DF/BDF calculation necessity determination unit 35, and an EVPN frame generation unit 39.

The basic function unit 10 includes an access port setting information database 33 holding information indicating whether the access port 11 has been set at Open or Closed during config setting, and an access port state database 34 holding the linked-up/linked-down state of the access port 11.

The EVPN function unit 12 includes the DF/BDF calculation necessity determination unit 35 for determining whether or not a DF/BDF calculation is necessary, a DF/BDF calculation unit 36 for actually performing the DF/BDF calculation, a DF/BDF state database 37 holding the DF/BDF state, an EVPN frame reading unit 38 for reading an EVPN frame, and an EVPN frame generation unit 39 for generating an EVPN frame.

The access port setting information database 33 holds the config setting of the open/closed state, as shown on a table in FIG. 14, for example. The access port state database 34 holds the linked-up/linked-down state of the access port 11, as shown on a table in FIG. 15, for example.

The DF/BFD calculation necessity determination unit 35 determines the necessity of performing a calculation and issuing an information generation command using determination references such as those shown on a table in FIG. 16, for example.

The DF/BDF state database 37 holds the IP addresses, DF/BDF states, and edge device states of the edge devices in ESI (Ethernet (registered trademark) Segment Identifier) units, as shown on a table in FIG. 17, for example.

The DF/BDF calculation unit 36 calculates the edge device that is to become the DF/BDF using a modulo operation or the like on the basis of the data held in the DF/BDF state database 37.

The EVPN frame reading unit 38 receives an EVPN-related frame from another edge device and transmits the Up/Down information of the other edge device, information relating to a DF/BDF recalculation command, and continuity confirmation information relating to a session with the other edge device to the DF/BDF calculation necessity determination unit 35 and the DF/BDF state database 37.

The EVPN frame generation unit 39 transmits information indicating variation in the state of the host edge device to the other edge devices in the form of an EVPN frame on the basis of an information generation command from the DF/BDF calculation necessity determination unit 35 and the DF/BDF state of the host device, sent from the DF/BDF state database 37.

The EVPN-oriented access port state determination unit 32 determines the state of the access port 11 to be transmitted to the EVPN from the DF/BDF state and the state of the access port 11, as shown on a table in FIG. 18, for example, and notifies the DF/BDF calculation necessity determination unit 35 and the DF/BDF state database 37 thereof. Note that when the DF/BDF state database 37 is notified, "Linked-up" and "Linked-down" are reread and transmitted as "Up" and "Down", respectively.

The access port opening/closing determination unit 31 determines whether to open or close the access port 11 from the setting information relating to the access port 11, the DF/BDF state, and the state of the access port 11, as shown on a table in FIG. 19, for example, and transmits an Open/Close command to the access port 11.

Operations of the respective function units will be described below, citing device startup and a representative example of a fault.

[Device Startup]

Figure 8:
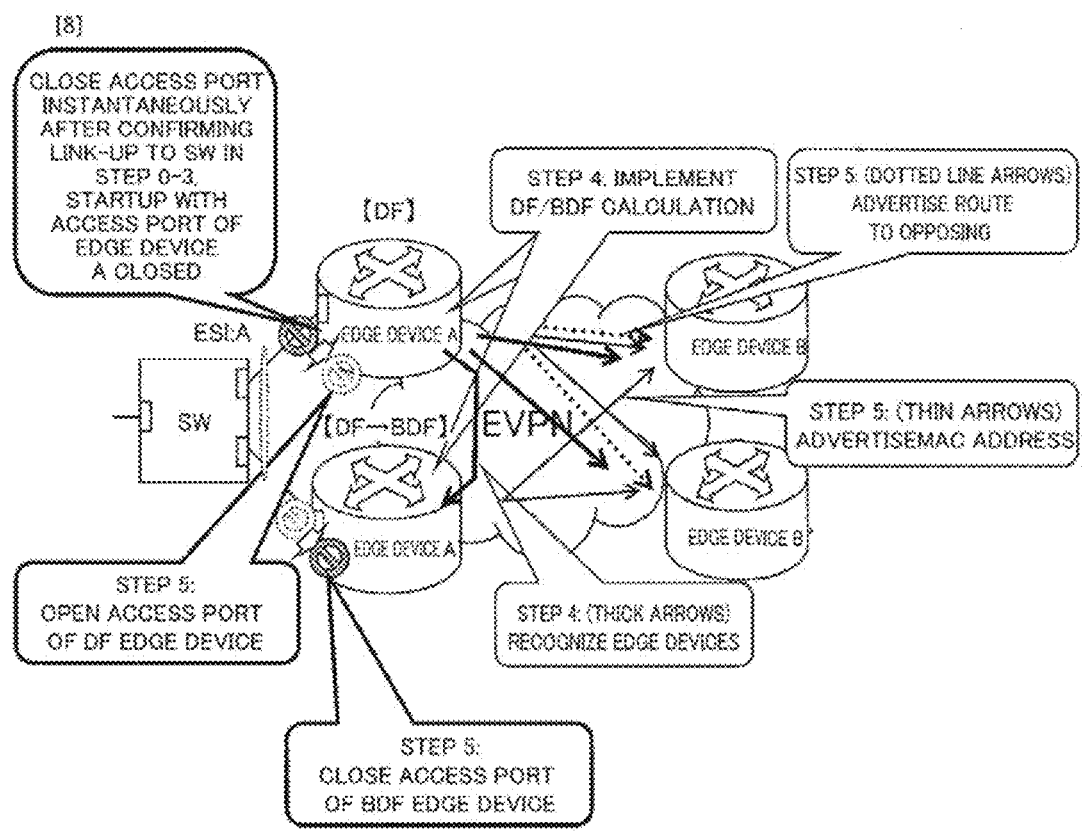
FIG. 8 is a view illustrating operations performed during startup of the edge device according to the present invention.
Figure 9:
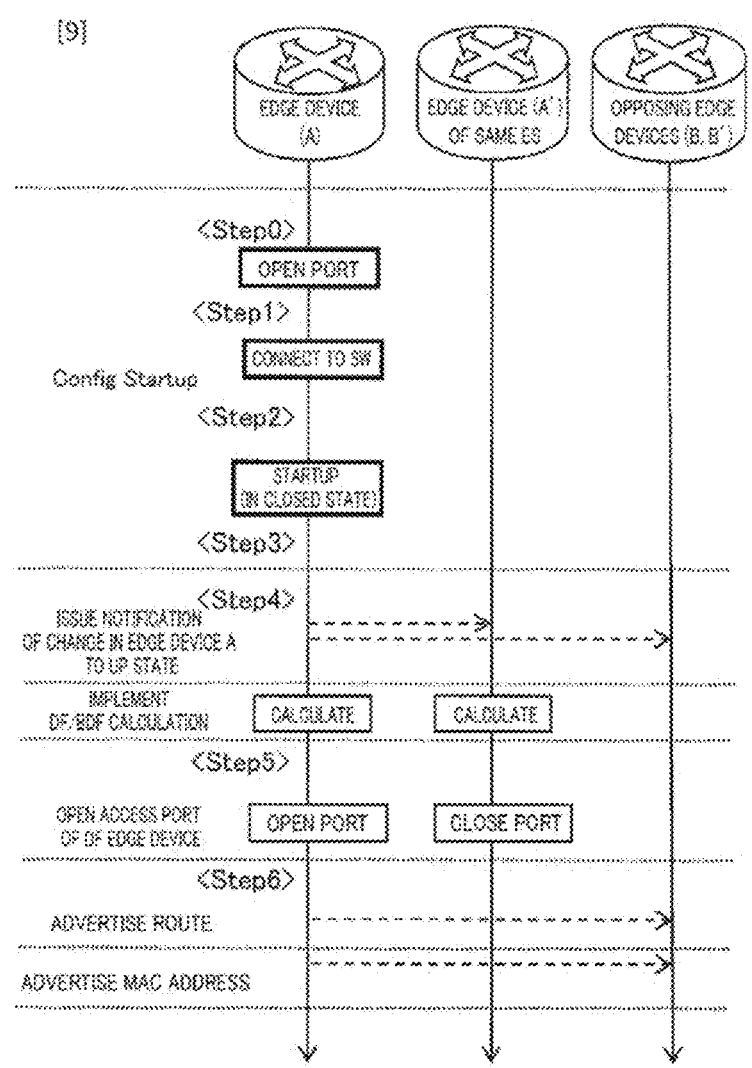
FIG. 9 is a sequence diagram implemented during startup of the edge device according to the present invention.

FIG. 8 is a view illustrating operations performed during startup of the edge device. FIG. 9 is a sequence diagram illustrating the operations performed during startup of the edge device. Thick lines denote the functions of the present invention. Note that here, a case in which an edge device A is newly started and connected after completing all config settings is envisaged.

The control unit 13 executes control to physically close the access port 11 after confirming that the access port 11 has been connected to an external device when the access port 11 is in a physically released state and the DF state is undefined, notify the other edge devices within the EVPN MH configuration that the host device has entered a state in which the host device may become the DF and cause the EVPN function unit to calculate the DF state to be set, physically open the access port 11 when the calculation result indicates DF, and physically close the access port 11 when the calculation result indicates BDF.

<Step 0>

The edge device A has completed config setting, and therefore the setting information of the access port 11 is set to Open on the table of FIG. 14 (an access port number 1 corresponds to the edge device A). Further, at this point, the DF/BDF state of the edge device is set at Undefined on the table of FIG. 19.

<Step 1>

The linked-down state is maintained until the edge device A is connected to an L2 switch SW, and therefore the open/closed state of the access port 11 is set at Open (a command to open the access port 11 is issued).

<Step 2>

At a timing when a connection to the L2 switch SW is established so that the edge device changes to Linked-up, the open/closed state of the access port 11 is set at Closed (a command to close the access port 11 is issued).

<Step 3>

Subsequently, since the access port 11 is actually closed, the state of the access port 11 changes to Linked-down, but as long as the DF/BDF state remains undefined, Closed is maintained as the open/closed state of the access port 11 (the command to close the access port 11 continues to be issued).

Through this series of operations, connection normality can be ensured by linking up the edge device English Translation of instantaneously with a subordinate device such as the L2 switch SW during startup, and by closing the access port immediately thereafter, the effects of loop generation can be minimized.

Note that on the table in FIG. 18, the DF/BDF state is undefined at the time of startup, and until the connection with the L2 switch SW is established, the access port 11 remains in the linked-down state. Accordingly, the EVPN-oriented access port state determination unit 32 notifies the EVPN function unit 12 that the access port 11 is to remain in the linked-down state. Here, at the timing when a connection is established with the L2 switch SW so that the access port is instantaneously linked up, the EVPN-oriented access port state changes to Linked-up. The EVPN-oriented access port state determination unit 32 then maintains the linked-up state even if the access port state subsequently changes from Linked-up to Linked-down.

<Step 4>

In other words, on the basis of the table shown in FIG. 18, the EVPN-oriented access port information determination unit 32 can notify the EVPN function unit 12 that the edge device has established a normal connection with the subordinate L2 switch SW so as to become a possible DF/BDF candidate. Then, in accordance with the table shown in FIG. 16, the DF/BDF calculation necessity determination unit 35 determines that it is necessary to perform a calculation and issue an information generation command in response to a change in the EVPN-oriented access port state, implements the DF/BDF calculation, and notifies the other edge devices that the edge device has changed from the down state to the up state.

<Step 5>

When the edge device becomes the DF as a result of the DF/BDF calculation, the access port opening/closing determination unit 31 modifies the open/closed state of the access port 11 to Open in accordance with the table shown in FIG. 19. As a result, the access port 11 of the edge device is linked up.

<Step 6>

Thereafter, the edge device begins normal communication by performing route advertisement and MAC address advertisement to the opposing edge devices in accordance with the EVPN system.

[When a Fault Occurs Between the Edge Device (DF) and SW]

Figure 10:
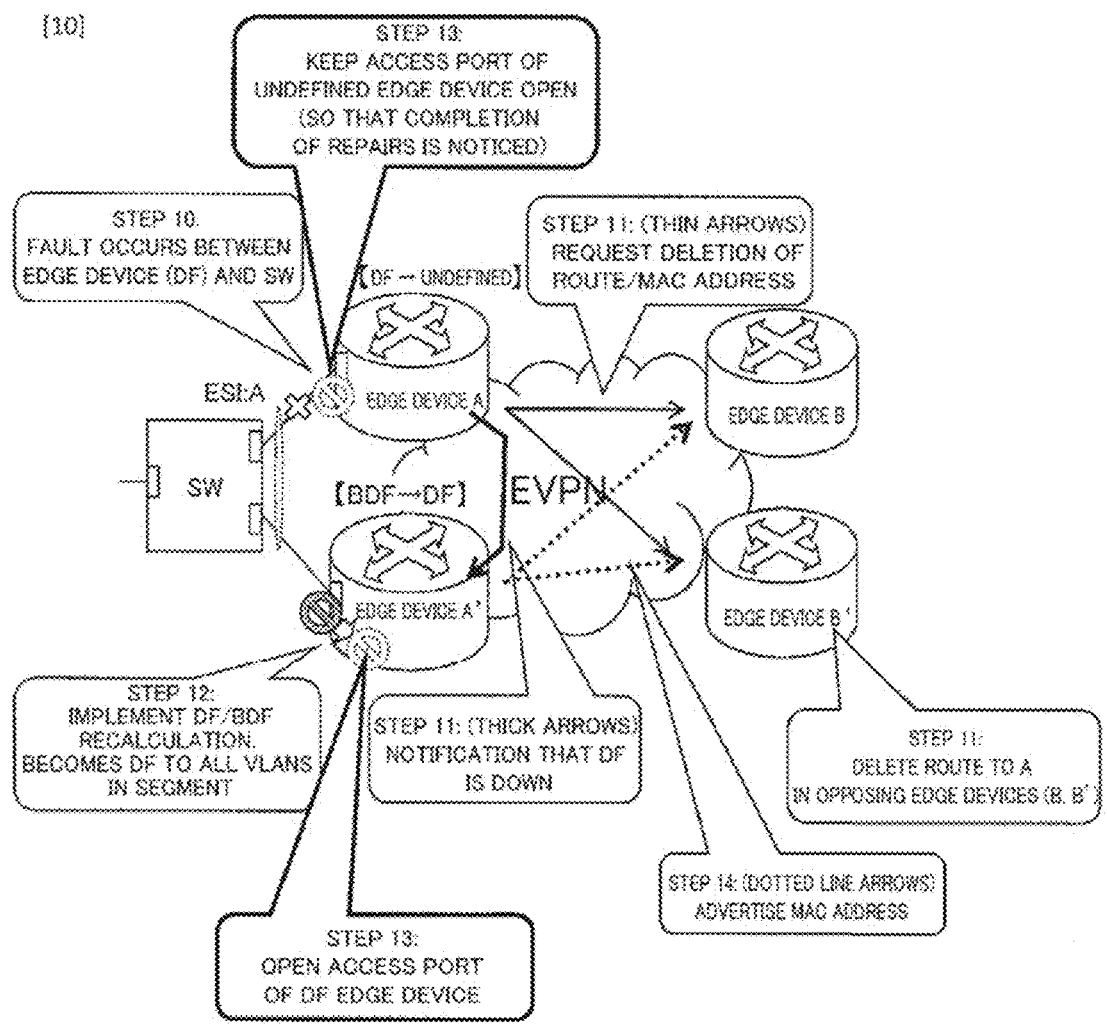
FIG. 10 is a view illustrating operations performed when a fault occurs under the control of the edge device according to the present invention.
Figure 11:
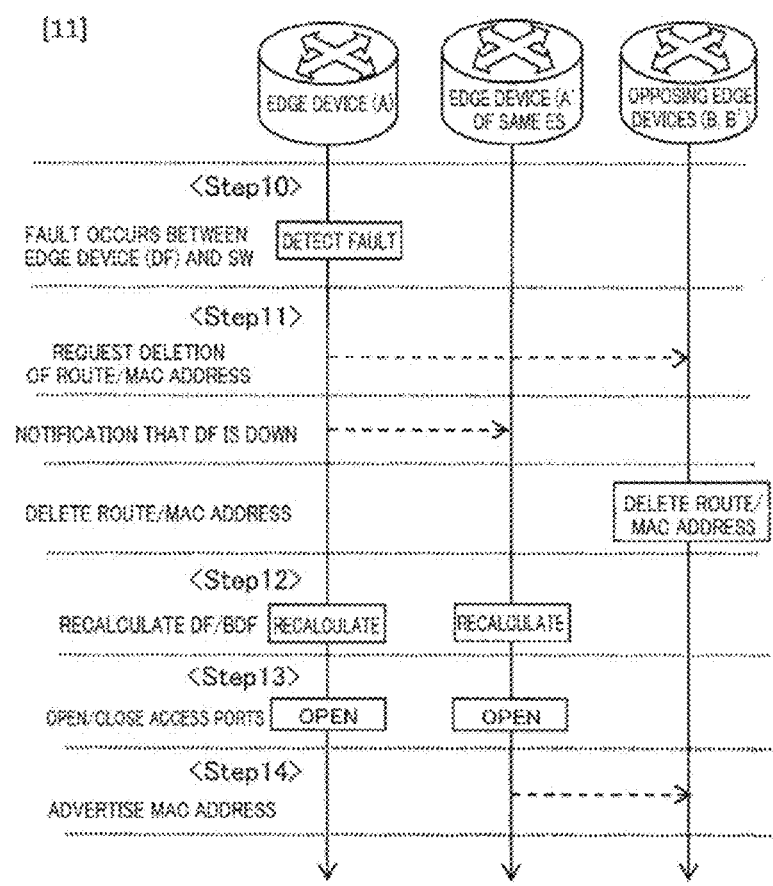
FIG. 11 is a sequence diagram implemented when a fault occurs under the control of the edge device according to the present invention.

FIG. 10 is a view illustrating operations performed when a fault occurs between the edge device A (DF) and the SW. FIG. 11 is a sequence diagram illustrating the operations performed when a fault occurs between the edge device A (DF) and the SW. Thick lines denote functions of the present invention.

When the connection between the access port and the external device is broken while the DF state of the host device is DF, the control unit 13 executes control to keep the access port physically open, set the DF state as Undefined, and cause another edge device included in the ES of the host device to calculate the DF state to be set.

Initially, in a state where normal communication is still possible, the access port state of the edge device A is Linked-up, the open/closed state of the access port is Open, and the DF/BDF state is DF.

In this case, the EVPN-oriented access port state determination unit 32 determines from the table shown in FIG. 18 that the EVPN-oriented access port state remains at Linked-up. Since there is no change in the EVPN-oriented access port state and the EVPN information from the other edge devices is normal, the DF/BFD calculation necessity determination unit 35 determines from the table shown in FIG. 16 that there is no need to perform a DF/BDF calculation and no need to issue an information generation command to another edge device.

<Step 10>

Here, a case in which a fault occurs due to a fiber break or the like between the edge device A and the L2 switch SW will be envisaged.

In this case, first, the state of the access port 11 changes to Linked-down. Since the state of the access port 11 has changed to Linked-down while the edge device remains at DF, the EVPN-oriented access port state determination unit 32 changes the EVPN-oriented access port state to Linked-down in accordance with the table shown in FIG. 18.

At this time, the DF/BFD calculation necessity determination unit 35 determines from the table shown in FIG. 16 that since the EVPN-oriented access port state has changed, it is necessary to perform a DF/BDF calculation and to issue an EVPN-oriented information generation command to another edge device.

<Step 11>

As a result of the DF/BDF calculation, the DF/BDF state of the linked-down edge device is calculated as being undefined, and the other edge devices are notified that the edge device A is linked down. Further, a request to delete the route and MAC address is issued to the opposing edge devices.

At this time, the setting information of the access port 11 remains at Open, the DF/BDF state is undefined, and the edge device is linked down, and therefore the access port opening/closing determination unit 31 sets the open/closed state of the access port 11 in the open state in accordance with the table shown in FIG. 19. Here, setting the access port 11 in the open state means that when fault recovery measures are taken subsequently so that the connection with the L2 switch SW is reestablished, the normality of the determination as to whether or not to link up the port is ensured. As long as the fault continues, the fiber remains physically broken, and therefore a loop is not generated even if the open/closed state of the access port 11 is set at Open. The open/closed state of the access port 11 may therefore be set in the open state.

Meanwhile, on the basis of the notification that the edge device A has been linked down, an edge device A' forming a pair therewith detects a change in the EVPN information between the up/down state of another device. Accordingly, the DF/BFD calculation necessity determination unit 35 of the edge device A' determines, on the basis of the table shown in FIG. 16, that it is necessary to perform the DF/BDF calculation but not necessary to issue an EVPN information generation command.

<Step 12>

The only edge device that belongs to the same ES and is set at Up is A', and therefore, in accordance with the DF/BDF calculation, the edge device A' is selected as the new DF.

<Step 13>

Next, since the setting information of the access port 11 indicates Open and the DF/BDF state indicates DF, the access port opening/closing determination unit 31 determines to set the open/closed state of the access port 11 at Open in accordance with the table shown in FIG. 19, whereby the access port 11 is opened.

<Step 14>

Subsequently, the MAC address is advertised to the opposing device in accordance with the EVPN system, whereby communication is started normally.

Second Embodiment

When the timings at which to open/close the access port 11 are misaligned between the edge device A and the edge device A' belonging to the same ES during edge device startup and so on, as described in the first embodiment, a loop may be generated. To avoid this loop, the access port 11 of the edge device having the access port to be opened may be opened after the edge device confirms that closure of the access port 11 of the other edge device is complete.

Figure 12:
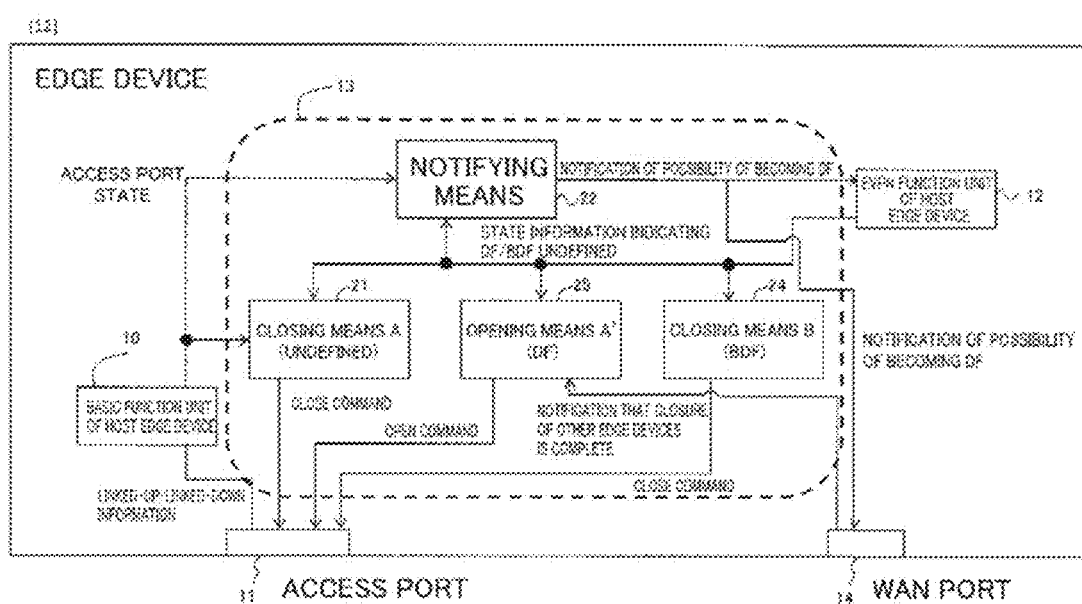
FIG. 12 is a block diagram illustrating a configuration of the edge device according to the present invention.
Figure 13:
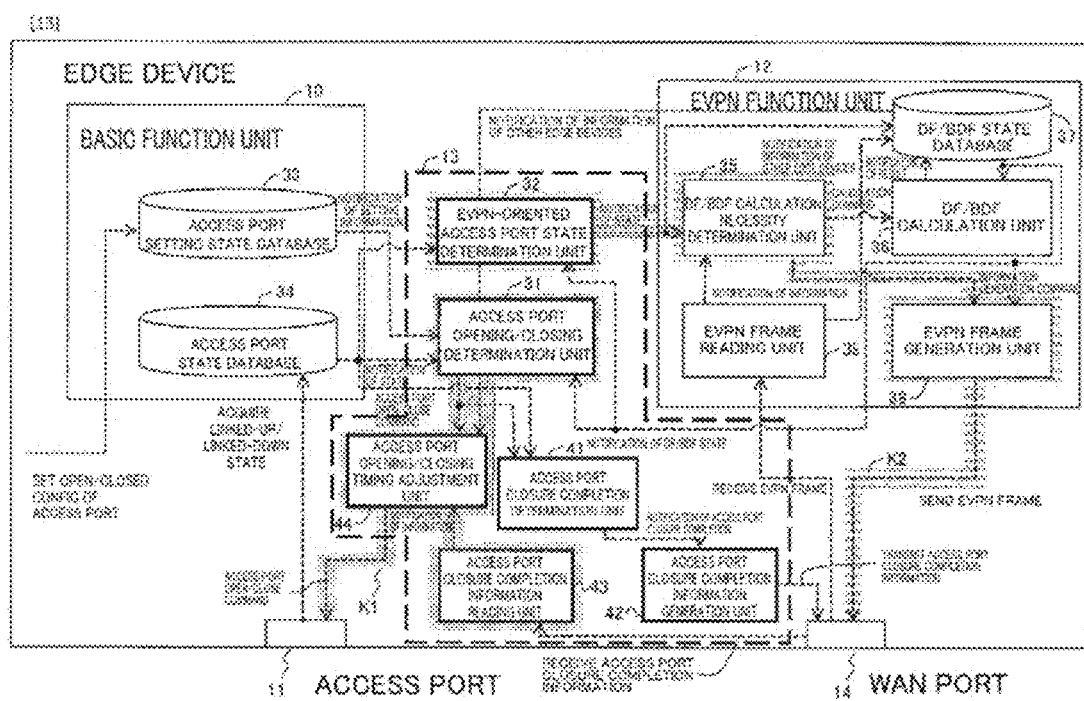
FIG. 13 is a block diagram illustrating a configuration of the edge device according to the present invention.

This control will now be described using FIGS. 12 and 13. FIGS. 12 and 13 are a schematic block diagram and a detailed block diagram illustrating the functions of the edge device according to this embodiment.

When the calculation result indicates DF, the control unit 13 of the edge device according to this embodiment physically opens the access port 11 after confirming that the access ports 11 of all of the other edge devices included in the ES of the host device are physically closed.

The control unit 13 includes the closing means A 21, the notifying means 22, opening means A' 25, and the closing means B 24.

The opening means A' 25 is "means for opening the access port 11 when the calculation result of the DF/BDF state of the edge device in the EVPN MH indicates DF after confirming that the access ports 11 of all of the other edge devices are closed".

Similarly to FIG. 7, the function block diagram of FIG. 13 is divided into the function units of an edge device conforming to normal EVPN MH and new function units (thick dotted lines) provided by the present invention. Further, as the normally provided function units, the EVPN function unit 12 is shown as a unique function unit of EVPN MH, and the basic function unit 10 is shown as a function unit included in a typical edge device regardless of the EVPN MH protocol. Furthermore, in the function block diagram of FIG. 13, the closing means A 21, the opening means A' 25, and the closing means B 24 are illustrated together as a function K1 including the access port opening/closing determination unit 31, an access port closure completion information reading unit 43, and an access port opening/closing timing adjustment unit 44, while the notifying means 22 is illustrated as a function K2 including the EVPN-oriented access port state determination unit 32, the DF/BDF calculation necessity determination unit 35, and the EVPN frame generation unit 39.

An access port closure completion determination unit 41 determines that the host edge device has been closed appropriately in accordance with a table shown in FIG. 20. After determining that the host edge device has been closed appropriately, the access port closure completion determination unit 41 sends an access port closure completion notification to an access port completion information generation unit 42. The access port completion information generation unit 42 transmits this information to the other edge devices through a WAN port 14.

The access port closure completion information reading unit 43, after receiving access port closure completion information from another edge device, transmits the information to the access port opening/closing timing adjustment unit 44.

When a Close command is issued by the access port opening/closing determination unit 31, the access port opening/closing timing adjustment unit 44 immediately sends a Close command to the access port 11. When an Open command is issued by the access port opening/closing determination unit 31, on the other hand, the access port opening/closing timing adjustment unit 44 checks the access port closure completion information sent by the access port closure completion information reading unit 43 on the basis of the edge device information sent from the DF/BDF state database 37. After confirming from this information that Closed information has been received from all of the other edge devices, the access port opening/closing timing adjustment unit 44 issues an Open command to the access port 11. The reason why the access port opening/closing timing adjustment unit 44 transmits the Close command to the access port 11 immediately but transmits the Open command to the access port 11 after determining the states of the other edge devices is to minimize the loop generation time.

[Notes]

The edge device according to this embodiment will be described below.

An object of the edge device is to enable anti-loop measures to be taken within the area of responsibility of the NW provider managing the EVPN network.

(1): An edge device used in EVPN MH includes the following means 1 to 4.

Means 1 closes the access port 11 as soon as the access port 11 is linked up in a state where the DF/BDF state of the edge device in the EVPN MH is undefined.

Means 2 notifies the host edge device and the other edge devices that the host edge device may become the DF even though the access port 11 is closed when the access port is linked up in a state where the DF/BDF state of the edge device in the EVPN MH is undefined.

Means 3 opens the access port 11 when the calculation result of the DF/BDF state of the edge device in the EVPN MH indicates DF.

Means 4 closes the access port 11 when the calculation result of the DF/BDF state of the edge device in the EVPN MH indicates BDF.

(2): The edge device used in EVPN MH described above in (1) includes means for opening the access port 11 after confirming that the access ports 11 of all of the other edge devices are closed when the calculation result of the DF/BDF state of the edge device in the EVPN MH indicates DF.

As shown in FIG. 4, the edge device implements anti-loop measures within the area of responsibility of the NW provider managing the EVPN network by closing one of the ports on the side of the responsibility demarcation point of the redundant edge devices in the EVPN network. Thus, the effects of loop generation can be minimized by a device of the NW operator while ensuring connection normality with a device of an NW user, and as a result, the problem of loop generation resulting from an attack or the like by an NW user with malicious intent can be solved.

Effects of the Invention

By employing this edge device, the effects of loop generation can be minimized by a device of the NW operator while ensuring connection normality with a device of an NW user, and as a result, the problem of loop generation resulting from an attack or the like by an NW user with malicious intent can be solved.

REFERENCE SIGNS LIST

10 Basic function unit
11 Access port
12 EVPN function unit
13 Control unit
14 WAN (Wide Area Network) port
21 Closing means A
22 Notifying means
23 Opening means A
24 Closing means B
25 Opening means A'
31 Access port opening/closing determination unit
32 EVPN-oriented access port state determination unit
33 Access port setting information database
34 Access port state database
35 DF/BFD calculation necessity determination unit
36 DF/BDF calculation unit
37 DF/BDF state database
38 EVPN frame reading unit
39 EVPN frame generation unit
41 Access port closure completion determination unit
42 Access port completion information generation unit
43 Access port closure completion information reading unit
44 Access port opening/closing timing adjustment unit

The invention claimed is:

1. An edge device within an EVPN MH (Ethernet Virtual Private Network Multihoming) configuration, comprising:
  an access port for connecting to an external device;
  a processor; and
  a storage medium having computer program instructions stored thereon, when executed by the processor, perform to:
  confirm the access port has been connected to an external device;
  determine state of the access port of the edge device;
  determine a DF (Designated Forwarder) state of the edge device;
  in response to confirming the access port has been connected to the external device and a determination that the DF state of the edge device is an undefined state, physically close the access port, notify other edge devices within the EVPN MH configuration that the host device has entered a state in which the host device may become the DF, and calculate either DF or BDF (Backup DF) as a DF state of edge device;
  physically opens the access port when the access port is open and the DF state is DF, and
  physically closes the access port when the access port is open and the DF state is BDF,
  keep the access port physically closed when the access port is open, the DF state is an undefined state and state of the access port is linked-up;
  physically opens the access port when the access port is open, the DF state is an undefined state, and the state of the access port is linked-down;
  designate a device fault for the edge device when the access port closed and the DF state is either DF or BDF; and
  physically closes the access port when the access port is closed and the DF state is an undefined state
  wherein, when the connection between the access port and the external device is broken while the DF state of the host device is DF, keep the access port physically open, sets the DF state as undefined, and cause another edge device included in an ES (Ethernet Segment) of the host device to calculate the DF state to be set.

2. The edge device according to claim 1, wherein the computer program instructions further perform to, when the calculation result indicates DF, physically opens the access port after confirming that the access ports of all of the other edge devices included in the ES of the host device are physically closed.

3. A control method for controlling an edge device within an EVPN MH configuration, the edge device comprising an access port for connecting to an external device and an EVPN function unit for calculating either DF or BDF as a DF state of a host device and setting the DF state of the host device on the basis of the calculation result, the control method comprising:
  confirming the access port has been connected to an external device;
  determine state of the access port of the edge device;
  determining a DF (Designated Forwarder) state of the edge device;
  in response to confirming the access port has been connected to the external device and a determination that the DF state of the edge device is an undefined state, physically close the access port, notify other edge devices within the EVPN MH configuration that the host device has entered a state in which the host device may become the DF, and calculate either DF (Designated Forwarder) or BDF (Backup DF) as a DF state of edge device;
  physically opening the access port when the access port is open and the DF state is DF
  physically closing the access port when the access port is open and the DF state is BDF
  keep the access port physically closed when the access port is open, the DF state is an undefined state and state of the access port is linked-up;
  physically opens the access port when the access port is open, the DF state is an undefined state, and the state of the access port is linked-down;
  designate a device fault for the edge device when the access port is closed and the DF state is either DF or BDF;
  physically closes the access port when the access port is closed and the DF state is an undefined state; and
  when the connection between the access port and the external device is broken while the DF state of the host device is DF, keep the access port physically open, sets the DF state as undefined, and cause another edge device included in an ES (Ethernet Segment) of the host device to calculate the DF state to be set.

4. The control method according to claim 3, comprising physically opening the access port after confirming that the access ports of all of the other edge devices included in the ES of the host device are physically closed when the calculation result indicates DF.

5. A non-transitory computer readable medium including instructions executable by one or more processors to:
  confirming the access port has been connected to an external device;
  determining a DF (Designated Forwarder) state of the edge device;
  in response to confirming the access port has been connected to the external device and a determination that the DF state of the edge device is an undefined state, physically close the access port, notify other edge devices within the EVPN MH configuration that the host device has entered a state in which the host device may become the DF, and calculate either DF (Designated Forwarder) or BDF (Backup DF) as a DF state of edge device;

physically opening the access port when the access port is open and the DF state is DF;

physically closing the access port when the access port is open and the DF state is BDF;

keep the access port physically closed when the access port is open, the DF state is an undefined state and state of the access port is linked-up;

physically opens the access port when the access port is open, the DF state is an undefined state, and the state of the access port is linked-down;

designate a device fault for the edge device when the access port is closed and the DF state is either DF or BDF; and physically closes the access port when the access port is closed and the DF state is an undefined state wherein, when the connection between the access port and the external device is broken while the DF state of the host device is DF, keep the access port physically open, sets the DF state as undefined, and cause another edge device included in an ES (Ethernet Segment) of the host device to calculate the DF state to be set.

* * * * *